March 15, 1938. H. J. BRUNK ET AL 2,111,316
CARBON HOLDER
Filed Feb. 4, 1937
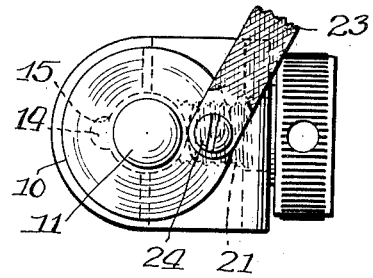
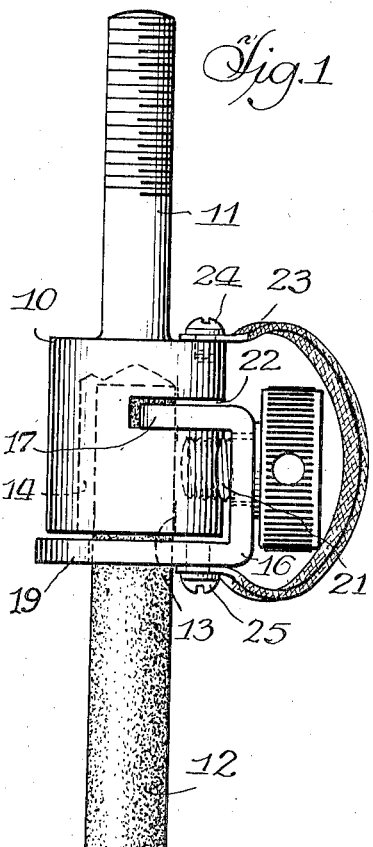
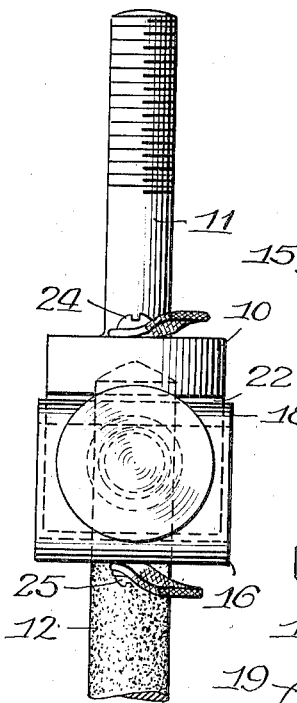
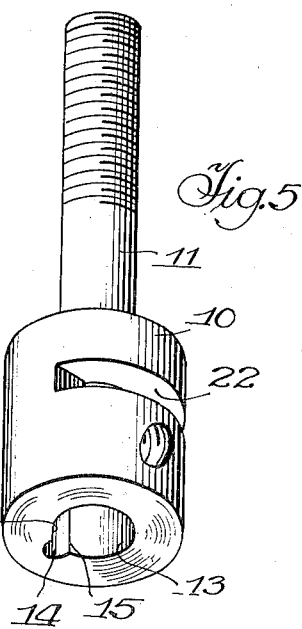
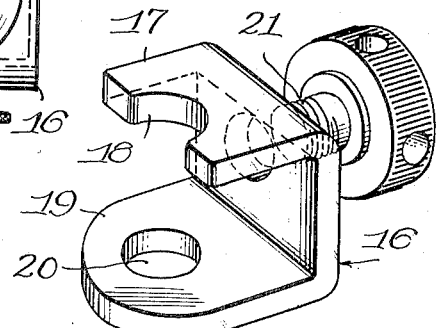
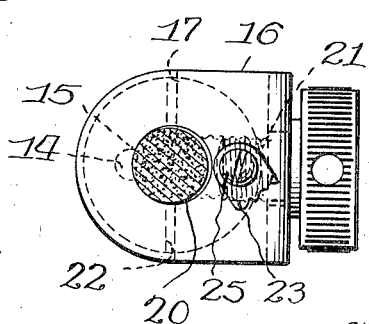
Inventors,
Harold J. Brunk
and Frederick F. Doerrich,
Dyrenforth, Lee, Chritton and Wiles, Attys.
Witness:
Chas. L. Koursh.

Patented Mar. 15, 1938

2,111,316

UNITED STATES PATENT OFFICE 2,111,316

CARBON HOLDER

Harold J. Brunk and Frederick F. Doerrich, Chicago, Ill., assignors to The C. F. Pease Company, Chicago, Ill., a corporation of Delaware Application February 4, 1937, Serial No. 124,123

10 Claims. (Cl. 176—119)

This invention relates to improvements in carbon holders such as are used in arc lamps.

The general object of the invention is to provide a carbon holder in which the carbon clamping device has a substantial area in contact with the carbon to insure good conductivity and avoid heating.

In certain carbon holders used heretofore, an adjustable screw has been forced against the side of the carbon rod to press the latter against the side of the cylindrical opening in which it is mounted. Difficulty has arisen at times due to chipping away of the carbon rod where the screw engages it, particularly where the rod is not copper coated. As a result, the carbon makes a loose contact with the body of the holder, resulting in arcing, and the holder eventually burns out.

A contributory object is to overcome the difficulty just mentioned by providing a carbon holder in which the clamping device maintains its grip indefinitely.

Another object is to provide means for preventing one of the carbon rods from being clamped in position with its longitudinal axis at an angle to or otherwise out of alignment with, the longitudinal axis of the other carbon rod, and to maintain the proper alignment.

An additional object is to provide relatively adjustable clamping members one of which engages the carbon rod at more than one point in the length thereof.

A further object is to provide a carbon holder in which the carbon may be readily clamped and from which the unconsumed portion may be readily removed.

Other objects and advantages will appear from the following description of a commercial embodiment of the invention.

In the drawing:

Fig. 1 is an elevation of a carbon holder with the carbon clamped in place;

Fig. 2 is another elevation thereof at right angles to Fig. 1;

Fig. 3 is a top plan view of the carbon holder;

Fig. 4 is a bottom view of the carbon holder with the carbon therein, in section;

Fig. 5 is a perspective view of the main part of the holder or block; and

Fig. 6 is a perspective view of the clamping member with its adjusting screw detached therefrom.

The main body of the carbon holder, in the illustrative form of the invention shown in Fig. 1, may have the form of a block 10 of suitable conducting material such, for example, as brass or copper, with a mounting rod or screw threaded stem 11 secured thereto. The carbon rod or electrode 12 is of the usual form and material. It is illustrated in the drawing as a depending carbon supported from above, but it may comprise the lower one of the two carbons 12, 12', of a conventional form of arc lamp, as for example an open flame arc lamp.

As shown in Fig. 5 the block has a recess in the form of a cylindrical hole 13 extending upwardly into the same in which the upper end of the upper carbon is seated. This opening is somewhat larger than the carbon and has at one side a parallel opening or recess 14 of reduced diameter, thereby providing two parallel edges 15 at one side, which are vertical when the block is mounted in vertical position. When said opening is viewed from above or below it presents in effect two points or inward projections in an otherwise smooth curve. Expressed in other terms, the opening viewed in horizontal sections has serrations providing what may be called ridges, to be engaged by a carbon. If the carbon is pressed laterally against these ridges it seats itself and maintains the desired alignment, i. e. it is preferably in substantial alignment with the screw threaded stem 11 and will also maintain the desired alignment with the lower of the two carbons.

The clamping members, generally speaking, comprise the body or block as one member and the U shaped clamp 16 as the other member. As shown in Fig. 6, the upper arm 17 of the U shaped clamp has a notch 18 which is curved to fit against the side of the carbon and the lower arm 19 has an opening 20 therein which receives the carbon and against the curved wall of which opening said carbon may be pressed, as hereinafter described. The means for pressing the two members of the clamp toward each other is the screw 21, having screw threaded engagement with a lateral opening in the block 10, and having any suitable device such as a knurled head to permit rotation thereof, to screw it further into said block and thus press the U shaped clamp against the upper end of the carbon, as shown in Fig. 1. The upper end 17 of the clamping member is received within a transverse slot 22 in the main body, as shown in Figs. 1 and 5.

When the screw is tightened, the carbon is pressed away from the axis of the stem and slightly to one side, as shown in Fig. 4, i. e. it is pressed against the vertical edges 15 and is thus prevented from being rocked or moved out of its desired alignment. As will be seen, the curved notch 18 in the upper arm of the bracket and the correspondingly curved portion of the opening 20 in the lower bracket bear against the carbon, thereby providing a substantial area in contact therewith to provide the necessary electrical contact without danger of excessive heating. In addition, contact is provided by the two edges 15, the areas of contact of which are slight, however. Under some conditions it may be desirable to increase the carrying capacity of the clamp by installing a conductor 23, as shown in Fig. 1, the same being secured to a suitable terminal 24 mounted on the block, and to another terminal 25 mounted on the U shaped bracket.

The parts described, when not in use, are held together by the screw. When the screw is loosened, the rod is easily slipped in the opening, which constitutes its seat, and when the screw is tightened the U shaped clamping member is moved radially inwardly to clamp said rod, but the inner end of said screw does not engage said rod. The thickness of the U shaped clamping member is such as to provide the desired areas of contact where it bears against the carbon in two places, and also to insure a cross section sufficient to provide ample conductivity. With this arrangement, the tendency heretofore encountered for the clamping screw to loosen, is practically eliminated.

The limitations "vertical", "horizontal", and the like are used herein in a relative sense to aid in a ready understanding of the preferred embodiment of the invention and not used in a limiting sense. It will be understood that various changes may be made in the apparatus described herein without departing from the spirit of the invention as expressed in the appended claims.

What is claimed is:

1. In a device of the class described, a carbon rod clamping member having vertical serrations against which a carbon rod may be positioned vertically, a second clamping member facing said serrated member and having a contact face formed to engage a substantial area of said rod, and means to press said clamping members together to insure good electrical contact between the same and said rod and to hold said rod in the desired alignment.

2. A carbon holder comprising a clamping member having two arms, each having a curved surface to fit the side of a carbon rod, a supporting member having a cylindrical recess therein in which said rod is positioned, and means to press said clamping member arms against said rod at two different places thereon longitudinally to provide a substantial contact area.

3. A carbon holder comprising a body having a longitudinal recess therein to receive a carbon rod, a U shaped clamping member associated with said body, the arms of said clamping member being adapted to fit against the side of said carbon rod at points separated longitudinally, and a screw associated with said clamping member to press the same against said rod.

4. A carbon holder as in claim 3, with the addition of longitudinal edges in said opening against which edges said rod is pressed.

5. A carbon holder comprising a block having a vertical opening therein to receive the end of a carbon rod, a transverse recess in said block intersecting said vertical opening, a bracket having lateral extensions, one of which is received within said recess and the other of which is positioned outside of said block to engage said carbon rod at points spaced vertically, and a screw mounted in said block for adjusting said bracket toward and away from said carbon.

6. A carbon holder comprising a body having a slot therein, an opening in said body intersecting said slot adapted to receive the end of a carbon rod, a U shaped clamping member adjustably secured to said body, one arm of said member having an opening through which said carbon rod passes, the other arm being shorter than said first mentioned arm and adapted to bear against the side of said rod, whereby the latter is engaged by said member in two places.

7. A carbon holding rod as in the preceding claim with the addition of a conductor electrically connected at one end to said body and at the other end to said member.

8. A device of the class described comprising a block of conducting material, a supporting stem projecting therefrom, an opening in the opposite side of said block in alignment with said stem, a transverse slot in said block intersecting said opening, a U-shaped member one arm of which has a notch therein and the other arm of which is longer than said first arm and has an opening therethrough, the shorter of the two arms being received within said slot, and a screw threaded member mounted in said body, passing through an opening in the base of said U-shaped member and serving to adjust it laterally to clamp a carbon rod in said longitudinal opening.

9. A device as in the claim immediately preceding in which said opening has a longitudinal slot in a wall thereof to provide two edges for engaging and aligning the carbon rod.

10. A carbon holder comprising a clamping member having a lateral projection, with a curved surface to engage the side of a carbon rod, a supporting member having a vertical recess with edges near the upper and lower ends thereof against which said rod is positioned, said curved surface engaging the side of said rod opposite said edges and between the upper and lower limits thereof, and means to adjustably press said clamping member toward said rod, whereby a substantial contact area is provided and whereby said rod is held in the desired vertical alignment without substantial damage to the surface thereof.

HAROLD J. BRUNK.
FREDERICK F. DOERRICH.